US008613883B2

(12) United States Patent
Gerritsen et al.

(10) Patent No.: US 8,613,883 B2
(45) Date of Patent: *Dec. 24, 2013

(54) DIAGNOSTIC SYSTEM AND METHOD FOR METALLURGICAL REACTOR COOLING ELEMENTS

(75) Inventors: Terry Gerritsen, Oakville (CA); Aloysius Henry Gunnewiek, Burlington (CA)

(73) Assignee: Hatch Ltd., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,184

(22) Filed: Jun. 3, 2011

(65) Prior Publication Data

US 2012/0166107 A1   Jun. 28, 2012

Related U.S. Application Data

(63) Continuation of application No. 11/460,805, filed on Jul. 28, 2006, now Pat. No. 7,976,770.

(60) Provisional application No. 60/703,430, filed on Jul. 29, 2005, provisional application No. 60/720,457, filed on Sep. 27, 2005.

(51) Int. Cl.
*C21B 7/10* (2006.01)

(52) U.S. Cl.
USPC .................................. 266/99; 266/46; 266/78

(58) Field of Classification Search
USPC .......................................... 266/96, 99, 46, 78
See application file for complete search history.

(56) References Cited

U.S. PATENT DOCUMENTS

| 3,908,397 A | 9/1975 | Prast et al. |
| 4,580,614 A | 4/1986 | Haissig |
| 5,158,366 A | 10/1992 | Nagai et al. |
| 5,348,396 A | 9/1994 | O'Rourke et al. |
| 5,867,523 A | 2/1999 | Wasmund et al. |
| 7,976,770 B1 * | 7/2011 | Gerritsen et al. ............... 266/96 |

FOREIGN PATENT DOCUMENTS

JP        61-112953        5/1986

OTHER PUBLICATIONS

T. Plikas, L Gunnewiek, and T. Gerritsen, "The Predictive Control of Furnace Tapblock Operation Using CFD and PCA Modeling", JOM, Oct. 2005, pp. 37-43.

(Continued)

*Primary Examiner* — Scott Kastler
(74) *Attorney, Agent, or Firm* — Bereskin & Parr LLP/S.E.N.C.R.L., s.r.l.

(57) ABSTRACT

Diagnostic methods and systems are used to determine operating condition and performance of a cooling element in a metallurgical reactor during operation of the reactor. The system can include sensing means, processing means and display means. The sensing means is located in or approximate the cooling element for sensing operating conditions of the cooling element. The processing means is in communication with the sensing means for receiving data corresponding to the sensed operating conditions and for processing the data to determine a relative condition indicator of the cooling element. The display means is in communication with the processing means and displays the relative condition indicator to a user of the diagnostic system. The display means can display a first, second or third state representative of the relative health indicator.

29 Claims, 10 Drawing Sheets

(56) References Cited

OTHER PUBLICATIONS

T. MA, J. Sarvinis, N. Voermann, B. Wasmund, J. Sanchez and O. Trifilio, "Recent Developments in DC Furnace Design", 35th Annual Conference of Metallurgists of the Metallurgical Society of CIM, Challenges in Process Intensification Symposium, Montreal, Quebec, Canada, Aug. 24 to 29, 1996.

S. De Vries, N. Voermann, T. MA, B. Wasmund, J. Metric and S. Kasinger, "Novel DC Furnace Design for Smelting Nickel and Cobalt Bearing Concentrate from Spent Alumina Catalyst", in Proceedings of the TMS Fail Extraction and Processing Conference, 4th, 2000, pp. 773-780, Oct. 22-25, 2000, United States.

J. Sarvinis, S. De Vries, K. Joiner, C. Van Mierlo, N. Voermann, F. Stober, C. Rule and P. Majoko, "Improvements to BHP Hartley Platinum Smelting Furnace", 4th International Conference COPPER 99-COBRE 99, Oct. 10-13, 1999, pp. 613-628.

K.M. Donaldson, F.E. Ham, R.C. Francki, and J.G. Schofield, "Deisgn of Refractories and Bindings for Modern High-Productivity Pyrometallurgical Furnaces", International Symposium on Non-Ferrous Pyrometallurgy, Aug. 23-27, 1992, Edmonton, Alberta, Canada.

A. Daenuwy, A.D. Dalvi, M.Y. Solar, and B. Wasmund, "Development of Electric Furnace Design and Operation at P.T. Inco (Indonesia)", International Symposium on Trace Metals and Furnace Practices in Non-Ferrous Pyrometallurgy, Met. Soc. of CIM, Edmonton, Alberta, Dec. 1992.

R. Veenstra, N. Voermann, and B. Wasmund, "Prototype Metal Tap Block Design", Proceedings of the Environment and Vessel Integrity in Nonferrous Smelting and Converting Symposium, Sudbury, Ontario, Canada, Canadian Institute of Mining, Metallurgy and Petroleum, Dec. 1997.

P.K. Iwamasa, G.A. Caffery, W.D. Warnica, and S.R. Alias, "Modelling of Iron Flow, Heat Transfer, and Refractory Wear in the Hearth of an Iron Blast Surface", Int. Conf. On CFD in Minerals & Metals Processing and Power Generation, Melbourne, pp. 285-295.

Y. Gordon, V. Shvidkiy, Y. Yaroshenko, N. Spirin and V. Lavrov, "A Diagnostics System for Refractory Lining Conditions in Metallurgical Furnaces", Advance Technology Symposium, Extending Blast Furnace Campaign Life, Myrtle Beach, South Carolina, Nov. 16-18, 1997.

L.H. Gunnewiek, L. Oshinowo, T. Plikas and R. Haywood, "The Application of CFD to the Design of Electric Furnaces", Multiphase Phenomena and CFD Modeling and Stimulation in Materials Processes, Dec. 2004, pp. 417-427.

N. Voermann, V. Vaculk, T. MA, C. Nichols, G. Roset and W. Thurman, "Improvements to Stillwater Mining Company's Smelting Furnace Yielding Increased Capacity and Productivity", Sulphide Smelting '98 Current and Future Practices, San Antonio, Texas, USA, The Minerals Metal and Material Society (TMS), Dec. 1998.

Vladimir Panjkovic and John Truelove, "Computational Fluid Dynamics Modelling of Iron Flow and Heat Transfer in the Iron Blast Furnace Hearth", Second International Conference on CFD in the Minerals and Process Industries: CSIRO, Melbourne, Australia, Dec. 6-8, 1999.

N. Voermann, F. Ham, J. Merry, R. Veenstra, and K. Hutchinson, "Furnace Cooling Design for Modern High-Intensity Pyrometallurgical Processes", in Proceedings of the Copper 99-Cobre 99 International Conference, Oct. 1999, Phoenix, Arizona, U.S.A.

\* cited by examiner

DIAGNOSTIC SYSTEM AND METHOD FOR METALLURGICAL REACTOR COOLING ELEMENTS

CROSS REFERENCE TO RELATED APPLICATIONS

This application is a continuation of U.S. patent application Ser. No. 11/460,805 filed Jul. 28, 2006 now U.S. Pat. No. 7,976,770 and claims the benefit of U.S. Provisional Patent Application Ser. No. 60/703,430 filed Jul. 29, 2005 and U.S. Provisional Patent Application Ser. No. 60/720,457 filed Sep. 27, 2005, the entire contents of all of which are hereby incorporated by reference.

TECHNICAL FIELD

The present invention relates generally to diagnostic systems and methods for metallurgical reactor cooling elements. In particular, the invention relates to diagnostic systems and methods for determining the performance and condition of such cooling elements in real time during the operation of the reactor.

BACKGROUND

Some metallurgical reactors employ cooling elements to conduct heat away from refractory linings in order to provide the safe containment and handling of molten slags, mattes, metals, and fused salts. The cooling elements are manufactured of a high thermal conductivity solid having internal channels through which is pumped a cooling medium for the purpose of extracting heat from the refractory lining by the cooling element. When sufficient heat is extracted by a cooling element, it is possible to maintain some thickness of relatively cool refractory or frozen (i.e. solidified) process material in the area of the cooling element. This is important for providing the necessary integrity for the safe containment of molten materials.

The solid material making up the cooling element may typically be copper and the cooling medium is typically water, though other solid materials and cooling media can be used. Such metallurgical reactor cooling elements may include, for example, a copper cooler built into the sidewall of the reactor or a tapblock for removing (or tapping) the molten process material from the reactor.

Cooling elements may comprise a cast rectanguloid copper block with internal channels to allow for the flow of the cooling medium, with refractory material placed between the cooling element and the molten process material in the reactor. The internal channels are typically pipes that are cast into the copper block during manufacture, that are externally connected to the system providing the cooling medium.

Tapblocks are a variant of a typical cooling element, in that there is a channel through the center of the cooling element lined with a refractory material through which the molten process material flows when the reactor is being tapped. The center channel is typically of small diameter, such as 1 to 4 inches, and is plugged with a hard clay material when it is not required to tap molten process material from the reactor. In order for the reactor to be tapped, the clay plug in the tapblock must be removed by drilling or lancing, or a combination thereof, so as to open the channel and allow the molten process material to flow out of the reactor.

Typical operations for a reactor, including tapping, result in the cooling elements experiencing thermal and mechanical stresses that may cause the condition of the cooling element to deteriorate with time, in effect reducing its ability to extract heat from the reactor. This is undesirable as it reduces the level of reactor integrity and safety provided by the cooling elements. If the cooling element performance is deteriorated below an acceptable safety limit, maintenance is required. Major maintenance may involve shutting down the reactor to replace part or all of the refractory in the tapping channel of a tapblock or replacing the complete tapblock, for example. Major maintenance of cooling elements is generally expensive and time consuming, and the time between major maintenance should be extended as long as possible.

In order for operators of the reactor to assess the current operating condition of the tapblock, the temperature and cooling media flow in certain parts of the cooling element may be monitored, for example, by temperature and flow sensing instruments distributed in and around the cooling element. Simulation by computer modeling in the design phase of the cooling element, using, for example, finite difference methods, may determine the expected temperatures and temperature profiles at the temperature sensing instrument locations.

Using computer models, alarm levels may also be established for each of the temperature and flow sensing instruments to determine whether the cooling element is currently experiencing temperatures or cooling media flows that are beyond what was expected during the design stage.

Such modeling involves comparing the temperature and flow readings at each sampled instant in time with pre-defined alarm levels. Generally two different alarm severities are available, denoted by Hi and HiHi (or Lo and LoLo for coolant flow). The Hi alarm is primarily a notification to the operator that the temperature is above the expected normal operating range. This alarm does not necessarily require any remedial action to be taken. The HiHi alarm indicates that the reactor may be experiencing damaging or dangerous temperature levels. If the HiHi level is exceeded, some automatic action may occur, like tripping the reactor breaker to remove power input and starting the process of reducing the temperature of the process material.

These temperature and flow alarms only provide an indication of temperature or flow excursions outside of what is considered desirable, and do not distinguish between the different particular conditions that could cause a temperature excursion, such as refractory wear, high process operating temperatures, or the deteriorating thermal or mechanical performance of the cooling element.

The described embodiments seek to address or ameliorate one or more shortcomings or disadvantages associated with existing means and methods of assessing the condition of a metallurgical reactor cooling element.

SUMMARY

Embodiments of the invention generally relate to diagnostic methods and systems for determining the operating condition of a cooling element in a metallurgical reactor during operation of the reactor.

Certain embodiments of the invention relate to a diagnostic system for a cooling element, the system comprising:

at least one sensor located in or proximate the cooling element for sensing operating conditions of the cooling element;

at least one processor in communication with the at least one sensor for receiving data corresponding to the sensed operating conditions and for processing the data to determine a relative condition indicator of the cooling element; and at least one display in communication with the at least one processor for displaying the relative condition indicator to a user of the diagnostic system.

In one embodiment, the at least one display comprises a display portion for displaying a first, second or third state representative of the relative condition of the cooling element. The first state may correspond to an operational state of the cooling element, in which the cooling element may be operated normally, the second state may correspond to a cautionary operational state of the cooling element, in which the cooling element should be operated under caution, and the third state may correspond to a non-operational state of the cooling element, in which the cooling element should cease operation or not initiate operation.

By monitoring the at least one sensor and performing diagnostics with the information provided, metallurgical reactor operators may be provided with an indication of whether or not the reactor equipment is being operated within its design constraints or in a way that would reduce the safe operating life of the cooling element. The indication may be provided by, for example, an indicator having Green, Yellow and Red (GYR) lights to resemble a traffic light. The green light may indicate, for example, that the cooling element is being operated within its designed operating conditions. The yellow light may indicate, for example, that one or more operating conditions is not being met or is outside the normal operating range and that attention to the cooling element or instruments is required. The red light may, for example, indicate that the cooling element is being operated substantially outside the normal operating range and should not be used further until the cause of the condition is investigated and resolved.

Alternatively, or in addition to display of the first, second or third state, the relative condition indicator may include a numerical or graphical representation of the relative condition of the cooling element on the at least one display.

The relative condition indicator may in part represent the long-term wear of the cooling element. The long-term wear may be determined at least in part by determining an area condition for each of a plurality of areas of the cooling element. The overall cooling element long-term wear may be determined at least in part by the lowest or highest determined area condition.

Other embodiments of the invention relate to a method for providing a relative condition indication of a condition of a cooling element. The method comprises sensing operating conditions of the cooling element; receiving data corresponding to the sensed operating conditions and processing the data to determine a relative condition indicator of the cooling element; and displaying the relative condition indicator to a user.

Further embodiments of the invention relate to a computer readable storage having stored thereon computer program instructions, which, when executed by a computer system, cause the computer system to perform the following steps: receiving data corresponding to sensed operating conditions of a cooling element; processing the data to determine a relative condition indicator of the cooling element; and displaying the relative condition indicator to a user.

BRIEF DESCRIPTION OF THE DRAWINGS

Embodiments of the invention are described in further detail below, by way of example only, with reference to the accompanying drawings, in which.

DETAILED DESCRIPTION

The described embodiments relate generally to diagnostic systems and methods for metallurgical reactor cooling elements. In particular, embodiments relate to diagnostic systems and methods for determining the condition and performance of cooling elements in real-time during operation of the reactor.

Figure 3:
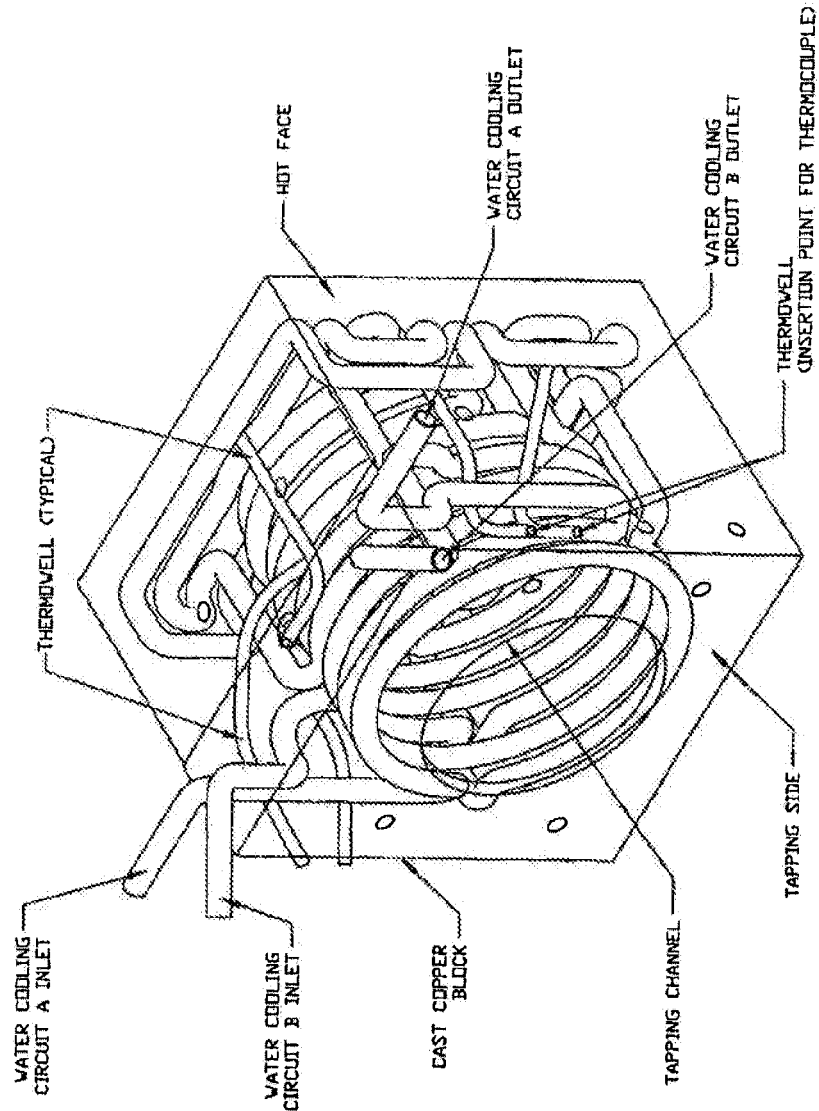
FIG. 3 is a perspective view of a tapblock cooling element, showing instrument locations in the tapblock.

While it should be understood that embodiments can be applied to various kinds of elements requiring diagnostic analysis of their condition within a larger apparatus, the described embodiments have particularly useful application to automated diagnostic analysis of tapblock cooling elements in a metallurgical reactor. The described embodiments also have particularly useful application to other cooling elements, such as copper coolers located in the walls, roof, or other areas of a reactor. For ease of illustration, the embodiments are described primarily in relation to their application to diagnostic analysis of tapblock cooling elements. An example tapblock cooling element is shown in FIG. 3.

In the drawings and in this description, like reference numerals will be used to indicate like elements, functions or features as between the drawings and the described embodiments.

Figure 1:
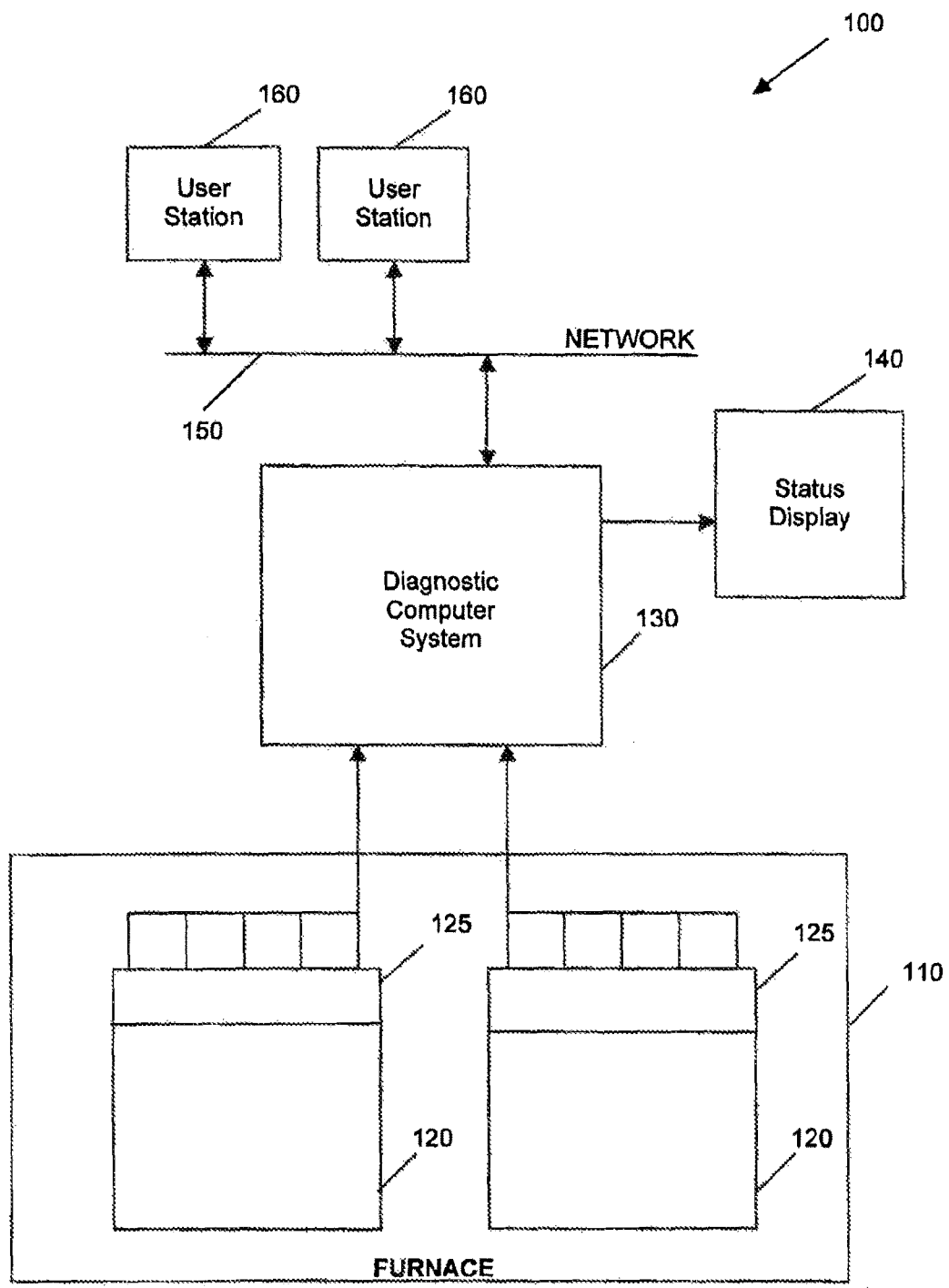
FIG. 1 is a block diagram of a diagnostic system for a metallurgical reactor, according to one embodiment of the invention.

One embodiment of the invention is shown in FIG. 1, in the form of a diagnostic system 100 for a metallurgical reactor 110. The metallurgical reactor 110 has a plurality of tapblocks 120 for tapping molten material from the reactor 110. The reactor 110 may have two tapblocks 120 as shown in FIG. 1, or it may have more tapblocks, for example for draining slag from the top of the reactor bath, as well as for drawing molten process material from lower levels. In some instances, the reactor may be run using only one operational tapblock 120.

Each tapblock 120 has a number of instruments 125 associated therewith, either located in the tapblock or nearby, for measuring the operating conditions of the tapblock 120. Such instruments include thermocouples, resistive temperature devices (RTDs) and flow meters, at a minimum and may include further instruments for measuring other process conditions.

Diagnostic system 100 comprises a diagnostic computer system 130, the instruments 125, a status display 140 and a plurality of user stations 160 connected to diagnostic computer system 130 over a network 150, such as an Ethernet control network. Diagnostic computer system 130 receives measurement data from instruments 125 and determines whether the tapblocks 120 are in a suitable condition for normal operation in the short term and determines a longer-term projection of the health of the tapblock. Use of the term "health" in this context is intended to indicate the relative condition and ability of the tapblock (or other cooling element) to perform its function properly and safely. Similarly, "health index" is intended to be an indicator of relative condition, wear and/or operability of the cooling element. Such an index can also be called a "wear index" or a "condition index."

Diagnostic computer system 130 provides an output to status display 140 for local indication of the operational status of the tapblocks independently of the connection to network 150. This operational status is also provided by diagnostic computer system 130 to user stations 160 for consideration by plant personnel situated away from the reactor 110. At least one such user station 160 may be located nearby the reactor 110 in order to provide a user interface to the diagnostic computer system 130 for use by a reactor operator stationed nearby reactor 110. Although not shown, diagnostic computer system 130 has a suitable user interface for receiving user input and providing output to the user.

Status display 140 provides a highly visible display positioned near reactor 110 to indicate the operational status of each of the tapblocks 120. The operational status is preferably indicated by one of three possible state indicators. The state indicators indicate an operational state, a cautionary state and a non-operational state. These states may be respectively indicated by green, yellow and red lights on status display 140 so as to resemble common traffic signals. Alternatively, other readily recognizable visual indicators can be used as the state indicators. Thus, for a reactor operator positioned near the reactor 110, status display 140 provides a ready indication of the operational status of tapblocks 120 and allows the reactor operator to take appropriate action according to the indicated status.

Figure 2:
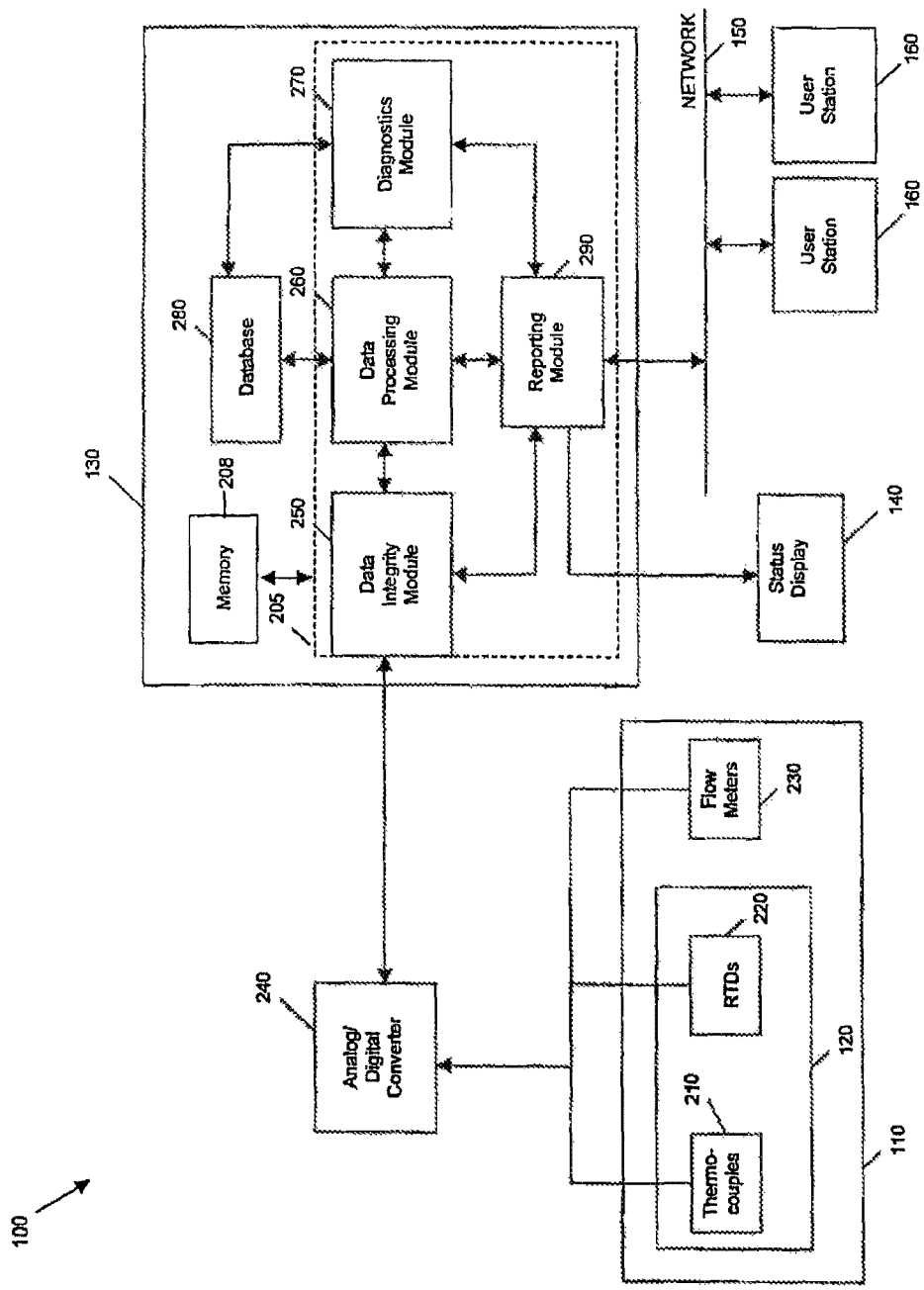
FIG. 2 is a block diagram of one embodiment of the diagnostic system of FIG. 1, showing a diagnostic computer system in further detail.

Referring now to FIG. 2, diagnostic computer system 130 is shown in further detail in the context of diagnostic system 100 of FIG. 1. As shown in FIG. 2, instruments 125 associated with tapblocks 120 include thermocouples 210, RTDs 220 and flow meters 230. Other forms of temperature and/or flow measurement instruments can be used instead, or in addition to, those shown. Each of these instruments 125 provides its analog output (corresponding to the relevant process variable measured by the instrument) to an analog to digital converter 240. The analog to digital converter 240 may be integrated with or co-located with the diagnostic computer system 130 or may be distinct and/or remote therefrom.

Diagnostic computer system 130 comprises computer software 205 stored in a memory 208 and executing on one or more computer processors (not shown) to perform the diagnostic function of diagnostic system 100 of FIG. 1. Computer software 205 comprises a plurality of software modules for processing the data received from instruments 125 (which include instruments 210, 220 and 230). Such software modules include a data integrity module 250, a data processing module 260, a diagnostics module 270 and a reporting module 290. Diagnostic computer system 130 further comprises a database 280 for storage and retrieval of diagnostic data generated by computer software 205 based on the received instrument data. Although computer software 205 is described as comprising software modules, some or all of the functions of the software modules may be executed in hardware. As an example, open circuit detection (described below) can be detected using software algorithms or by the hardware of the analog input card that the instrument is connected to. An alternative diagnostic system embodiment, designated by reference number 900, is shown and described later in relation to FIG. 9.

For ease of explanation of the functions and interactions of the various components of diagnostic systems 100 and 900, specific features and functions of instrumentation will be described first, followed by a description of specific features and functions of the software modules in computer software 205.

Instrumentation

For a reactor element such as a tapblock or a copper cooler, thermocouples 210 must be positioned so as to have their sensing junctions located as close as possible to the point at which the desired temperature is to be measured. FIG. 3 illustrates an example tapblock and shows example cooling conduit and thermowell configurations.

It is important to have the time constant (the time it takes for the instrument reading to reflect a change in process conditions) of the thermocouples and RTDs as similar as possible because some of the subsequent analysis, for example, such as the Principal Component Analysis, involves comparing the time response of the outputs of the thermocouples and RTDs.

As illustrated in FIG. 3, the tapblock is roughly rectanguloid and has a roughly cylindrical tapping channel running through its centre. The tapping channel is normally lined with refractory material, which comes into contact with the molten process material during tapping and which shields the copper block from damage. One side of the tapblock is designated as the "hot face", as it faces toward the inside of the metallurgical reactor. The opposite face of the tapblock is the tapping side.

The tapblock in the illustrated example includes two water-cooling circuits (A and B) for passing cooling water through the tapblock to remove heat therefrom during tapping. The water cooling circuits have the RTDs (or other suitable temperature sensors) positioned in relation thereto for sensing the inlet and outlet water temperatures for each cooling circuit. The water cooling circuits are provided by cast-in piping that circles the cylindrical tapping channel and passes along areas of the hot face.

The tapblock illustrated in FIG. 3 also includes thermowells positioned to receive thermocouples at appropriate locations for taking the desired temperature measurements.

Good standard instrumentation engineering practice for grounding and shielding of instrumentation cables must be used to ensure that clean, low noise signals are available to the diagnostic system. In addition, the area around a furnace is a harsh environment with high temperatures and there is a possibility of splashing molten process material or slag. The instrument arrangement including cabling must be carefully designed to survive in such an environment. Cable and instrument thermal shields are often required to protect the equipment.

For improved reliability and availability, dual instruments can be used where two individual thermocouples or RTDs are installed at the same location, thus providing a redundant measurement. For example, dual RTDs may be used to measure a reference water temperature, such as the inlet water temperature, because this reading is used as a basis for subsequent analysis like the temperature-based wear index. Also, there are no opportunities to estimate the reference water temperature from other temperature readings without affecting the accuracy of the subsequent analysis.

Dual insert thermocouples are used because the insert thermocouple (when available as part of the tapblock design) is used to provide an indication of the start and end of tapping.

An insert thermocouple is that which is in the refractory material closest to the tapping channel. Analysis of the readings from the redundant instruments allows faulty readings to be detected by comparing the data from the two instruments. If both instruments are functioning correctly, the readings from both instruments will be substantially the same, whereas if one of the two instruments is faulty, the readings from the two instruments will diverge.

In addition to the thermocouples and RTDs, additional high-resolution temperature readings can be obtained using optical techniques that involve inserting a fiber optic cable positioned in the water passage (or with suitable protection cast in the copper or inserted in the refractory) of the tapblock and directing light of predetermined wavelengths along the fiber. Two techniques that can be used to measure temperature based on the characteristics of reflected light include: 1) Fiber Bragg Gratings and 2) Raman Back-scattering. Such techniques rely on the temperature dependence of light reflection by formations within the fiber. For application in a tapblock or reactor vessel cooling element, the Bragg Grating appears to be the more appropriate option because it would provide readings of about 0.1 degree accuracy at spacings of 10 cm and 100 or more reading sites would be available with a single fiber.

Figure 4:
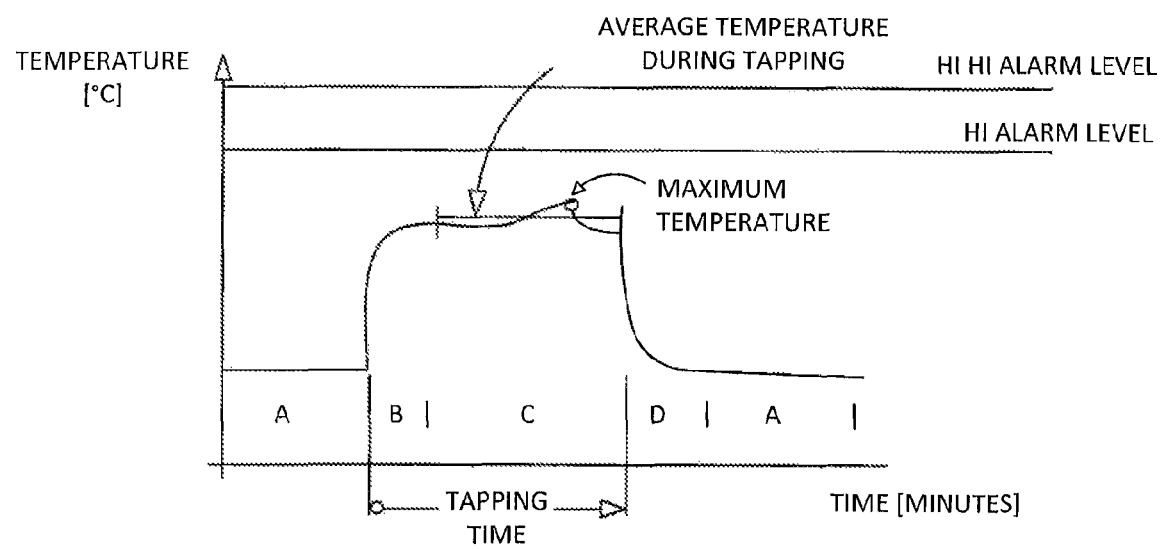
FIG. 4 is a graph showing typical temperature characteristics sensed by a thermocouple in a tapblock cooling element during pre-tapping, tapping and post-tapping operations.

Shown in FIG. 4 is an example plot of temperature versus time, as sensed by an insert thermocouple in a tapblock shown in FIG. 3. The tapping cycle may be viewed as having four stages, denoted by A, B, C and D. Stage A denotes a period prior to tapping or after tapping, in which the temperature in the tap block is relatively low and stable. Once a tapping operation is initiated, the number of the tapping operation is tracked for recording and maintenance purposes and the rate of temperature increase is measured.

The period during which the temperature increases is designated as stage B. The rate of increase of temperature during stage B is monitored and recorded. Once the level of the increased temperature stabilizes and is relatively constant, the tapping operation is considered to be in stage C. During stage C, the average temperature measured during tapping is recorded, together with the maximum sensed temperature. Stage D occurs when the tapping operation is stopped and the sensed temperature in the tapblock generally decreases. During stage D, the rate of decrease of the temperature is measured.

During, before and after the tapping operation, various measurements and statistics concerning the tapping operation are gathered in addition to those mentioned above. For example, the total tapping time is recorded, together with the temperature during stage A before and after tapping and the total time in which the temperature exceeded the Hi Alarm level and HiHi Alarm level, if at all. If the temperature exceeded either alarm level, the amount by which the alarm level was exceeded is also recorded for diagnostic purposes, as described below.

Software Modules

Data integrity module 250 is responsible for analyzing the incoming signals to determine whether the data being gathered is reliable by detecting possibly faulty instrumentation. An instrument is flagged as faulty if one or more of the following conditions is detected:

The signal is very noisy, indicating a bad connection. This is detected when data integrity module 250 determines that the standard deviation of the signal is above a predefined threshold.

The signal is inactive. This indicates that there is a communication problem between the analog/digital converter 240 and an instrument 125 or between the analog/digital converter 240 and the diagnostic system 130. Inactive signals are detected if the reading from the instrument 125 remains unchanged for a predefined period of time.

An open circuit is detected. RTDs usually employ a transmitter that provides an output between 4 and 20 mA. An open circuit condition is determined when no current is detected. For thermocouples, an open circuit condition results in a high temperature reading beyond the limit of measurement range. If a reading right at the limit of the detection range for the analog to digital converter is encountered, the thermocouple is detected as open circuit.

High rate of change. This condition is triggered if an instrument reading increases or decreases at a rate that is beyond what is physically possible for the instrument, in which case data integrity module 250 determines that the readings are false readings.

For redundant instruments, if the two instruments do not provide identical readings, the instruments are determined by data integrity module 250 to be faulty.

Drift. There is a concern that over an extended period of time instruments will drift out of calibration. Drift is detected by examining the long-term trend of the data to detect a small but steady positive or negative drift in the readings that indicates a faulty instrument.

Thermocouples in copper cooling elements may experience a "floating" condition. The term "floating" is applied to the condition where a thermocouple is not touching the bottom of the thermowell in which it is installed and this results in a thermocouple reading lower than the actual copper temperature. For example, in a copper element cooled by water flowing in cast-in piping, the sources of heat are from the hot face nearest the reactor bath and the tapping channel. The thermocouple junctions are positioned between the water cooled passage and one or more heat sources and as a result, the thermocouple temperature reading should be between the water temperature and the temperature of the heat sources. If the measured thermocouple temperature is lower than the measured water temperature the thermocouple is flagged as "floating" because this condition is not physically possible.

If an instrument or its readings are flagged as faulty because of one of the conditions above, the expected value of the instrument can, in some cases, be re-constructed using the readings from adjacent instruments. In certain embodiments, the reconstruction is done using a neural network that is trained using data generated from computer modeling of the thermal behavior and characteristics of the tapblock. The use of model data enables calibration of the reconstruction neural networks of the diagnostic system 130 during the design stage, before the diagnostic system 130 is installed for operation. Some calculations of diagnostic system 130, including Principal Component Analysis (PCA) calculations, require data from many instruments to function properly.

In alternative embodiments, the instrument value of the faulty instrument can be reconstructed using the average or weighted average of two or more nearby instruments.

The use of re-constructed data advantageously enables the calculations to be carried out even with a limited number of faulty instruments. The neural network resides in (or is at least controlled by) data integrity module 250 and includes a software process taking two or more inputs and providing one output. The output is the estimated temperature reading for the faulty instrument and the inputs are the temperature readings from two or more adjacent instruments. The output of the process is generated using standard neural network algorithms, such as are described in texts in the neural network field.

The data processing module 260 is responsible for calculating the metrics or extracting features of the measured temperature profiles for each of the instruments that is providing valid temperature data. The data processing module 260 receives temperature readings from the data integrity module 250 and provides outputs to the diagnostics module 270 and reporting module 290. FIG. 4 shows an example temperature profile analysis that the diagnostic system performs.

The data processing module 260 includes algorithms to identify the start and end of tapping and assigns a unique identifying number to each tapping event. The beginning and end of tapping are identified by the temperature profile of a thermocouple physically located near the tapping channel (insert thermocouple) or by signals from a mudgun used to open and plug the tapping channel. The tapping duration is determined as the difference in timestamp between the start and end of tapping. Using a thermocouple near the tapping channel, the temperature rate of change and the temperature magnitude are sensed and used to indicate the start and end of tapping. Alternatively, the combination of the mudgun position in front of the taphole and the use of the mudgun drill also signify the start of tapping. The combination of the mudgun position in front of the taphole and an increase in mudgun pressure indicates the end of tapping. Appropriate position switches (not shown) and other instrumentation are used to indicate the position and use status of the mudgun.

Statistics are generated from the measured data for each tap and are saved in the database 280. Typical data that are extracted for each tap include the rate of increase at the start of the tap, the tapping time, the maximum temperature during the tap, the average temperature during the tap and the steady temperature before and after the tap. The temperature data gathered during the tapping operation and stored in the database 280 can be used for further critical analysis of the tapping events by software or by plant personnel.

The diagnostics module 270 is responsible for examining the data from the instruments to extract two main outputs: 1) the current operating condition of the tapblock, as displayed on display 140 and on user stations 160, for example as a traffic light (green, yellow and red); and 2) a health index that represents the long-term wear on the tapblock. For both the traffic light and the health index, the diagnostics module 270 provides supplemental outputs with supporting information related to the two main outputs.

The traffic light (green, yellow and red) indications serve to notify the operator when conditions occur that are likely to reduce the life of the block or reduce the safety of the tapping operation. The color of the light is determined from a set of rules that are IF . . . THEN statements determined according to operational limitations, design expertise and operational experience. The heuristic rule set may be modified or re-configured depending on the modes of operation and as experience with the specific tapblock is gained.

The most severe light color determined by any of the rules is displayed as the overall condition of the tapblock. If any of the rules that trigger a yellow are active, the condition will be yellow. If any of the rules that trigger a red condition are active, the condition will be red. Yellow takes priority over green and red takes priority over both yellow and green. The overall status will be green only if no rules are triggered.

All active rules are displayed on supplemental operator screens. The purpose of displaying the complete rule set is to provide guidance to the reactor operators in determining the cause of the change in condition. For example, the displayed breached rule may indicate an unexpected temperature profile during tapping. The Rule-based diagnostic system also provides output to assist in the maintenance of the reactor tapblock or cooling element. For example, a rule may relate to a scheduled refractory lining replacement on the tapping channel of the tapblock.

Some example rules include:

Too many taps since the last repair of the tapping channel refractory bricks. The light is changed from green to yellow if the number of taps since the last brick repair is greater than a pre-configured number. The light will change from yellow to red if a second higher number of taps is completed without performing a repair. Tapping channels usually include several layers of bricks that are numbered starting with layer one at the cold face (outside of the furnace) of the tapping channel and with higher numbers towards the inside of the furnace. Each layer can have a different specified number of taps before a repair is required and separate rules are used to track the number of taps for each layer.

Shallow drill depth. If the depth that is drilled to open the tapping channel is shallow (less than a predefined depth), the light is changed from green to yellow. If the shallow drill depth is experienced on multiple consecutive taps, the light is changed from yellow to red.

To announce degradation of the tapblock health (described below), a rule related to the tapblock health index is added to the GYR indication. The GYR indication can be green for a health index greater than 60%, yellow for a health index between 60% and 30% and red when the health index is less than 30%, for example. These threshold percentages are configurable and are provided by way of example.

The time it takes to tap the reactor. The beginning and end of tapping are identified by the temperature profile of a thermocouple physically located near the tapping channel (insert thermocouple) or by signals from a mudgun used to open and plug the tapping channel. The tapping duration is determined as the difference in timestamp between the beginning and end of tapping. Using an appropriately located temperature sensor, such as the insert thermocouple, the temperature rate of change and the temperature magnitude are sensed and used to indicate the start and end of tapping. The mudgun position (in front of the taphole) and the use of the mudgun drill also signify the start of tapping. The mudgun position (in front of the taphole) and an increase in mudgun pressure also indicate the end of tapping. The tapping duration or length of time to fill a ladle can be used to determine an indication of the tapping channel size. The traffic light is changed from green to yellow (or red) if the tapping time is less than a pre-determined time, which would indicate that the tapping channel is worn and has increased substantially in size.

Large taphole diameter. If the measured taphole diameter is larger than a predefined size, the traffic light will change from green to yellow. A second even larger measured taphole diameter will change the light from yellow to red.

Profile analysis, which examines the temperature profile for each individual instrument and flags unexpected conditions. For example, the traffic light would be changed from green to yellow if the temperature after the tap did not return to the pre-tap temperature within a pre-configured temperature margin in a pre-configured amount of time. The rate of change and absolute temperature readings are other profile features that are examined, for example to determine the tapping duration as described above.

Other rules are derived from performing Principal Component Analysis (PCA) on the data gathered from the tapblock instruments 125. PCA is a technique that is used to reduce the amount of data recorded by many instruments down to a few principal components that characterize the process. In many processes, the instrument readings are highly correlated, with many instruments responding similarly to an event. This is true for a tapblock where all the thermocouples respond to tapping events in a similar fashion.

Figure 8:
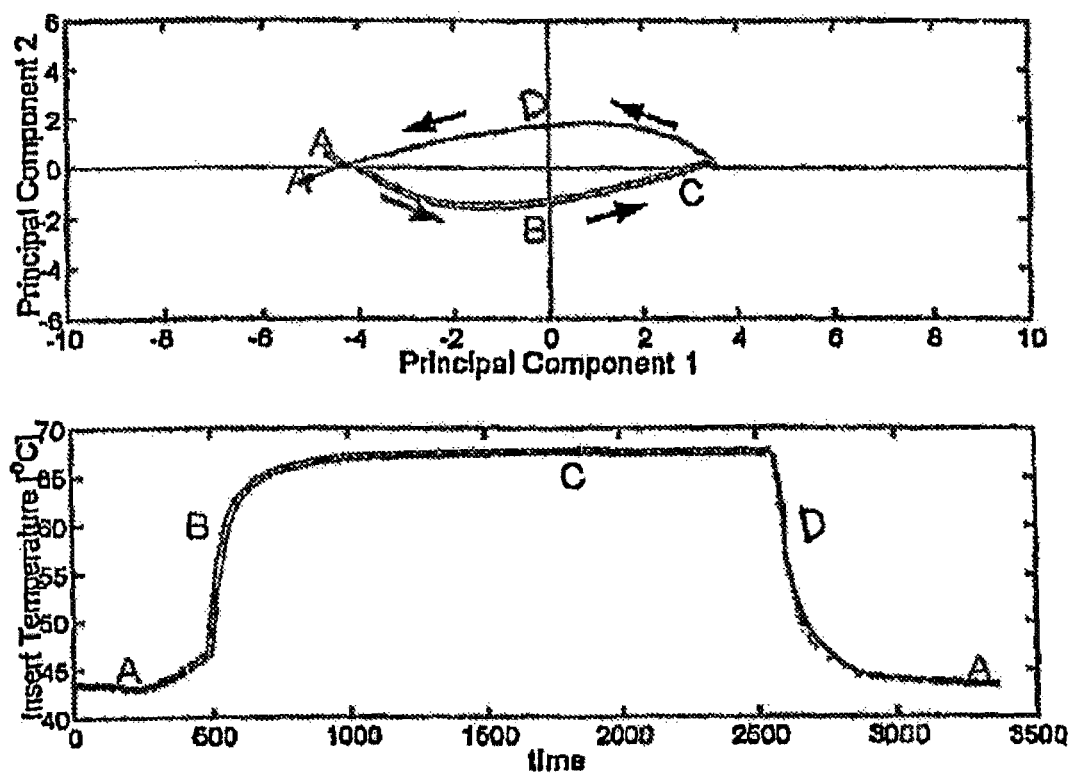
FIG. 8 is a chart of an example Principal Component Analysis (PCA) for a tapping procedure.

When a Principal Component Analysis was run using numerically modelled data (for example, by computational fluid dynamics (CFD)) for a new tapblock, it was determined that two components, labeled Principal Component 1 and Principal Component 2 in the upper half of FIG. 8, were sufficient to represent the variation seen in the temperatures during a tapping event.

The principal components have the following physical meaning when describing the behavior of the tapblock. The x-axis, or Principal Component 1, is the overall average of the temperature measurements in the block, and a shift in the positive x-axis indicates a general increase in block temperature. The y-axis, or Principal Component 2, can be thought of as the overall difference of the temperature measurements in the block, and a shift in the positive y-axis indicates a general increase in temperature in some areas of the block (say, the upper half) relative to other areas of the block (say, the lower half). The principle component plot in FIG. 8 corresponds to sensed temperatures during a tapping operation, as illustrated with respect to stages A, B, C and D in the bottom half of FIG. 8.

As an illustration, consider a simple example where there is a tapblock with only two thermocouples. Suppose that the two thermocouples in different locations in the block have identical temperature readings: $T_1=T_2=T$. Principal Component 1 describes the average of the two thermocouples:

$$P_1 = \frac{1}{2}(T_1 + T_2) = T. \quad \text{Equation 1}$$

Principal Component 2 describes the difference between the two thermocouples:

$$P_2 = T_1 - T_2 = 0 \quad \text{Equation 2.}$$

Consider the case where the temperature at each thermocouple increases by 5° C. The average or Principal Component 1 would increase by 5° C. and there would be a shift in the positive x-axis on the Principal Components plot. However, the difference between $T_1$ and $T_2$ remains the same at zero and there would be no shift in the y-axis. Consider a different case where $T_1$ increases by 5° C. and $T_2$ decreases by 5° C. This time, the average or Principal Component one, remains the same and there is no shift in the x-axis, but the difference between $T_1$ and $T_2$ increases, and there is a shift in the positive y-axis.

The PCA represents the readings from all of the tapblock instruments (a dozen or more) as heating and cooling cycles of only two components (Principal Component 1 and Principal Component 2) as shown in the upper part of FIG. 8. Every point in the plot in FIG. 8 represents the process status (instrument readings) at a specific time as the tap is occurring. PCA calibration refers to the procedure to determine the contributions of the individual readings to each of the components. For example, the coefficients in equation 1 are ½ for $T_1$ and ½ for $T_2$.

Figure 10:
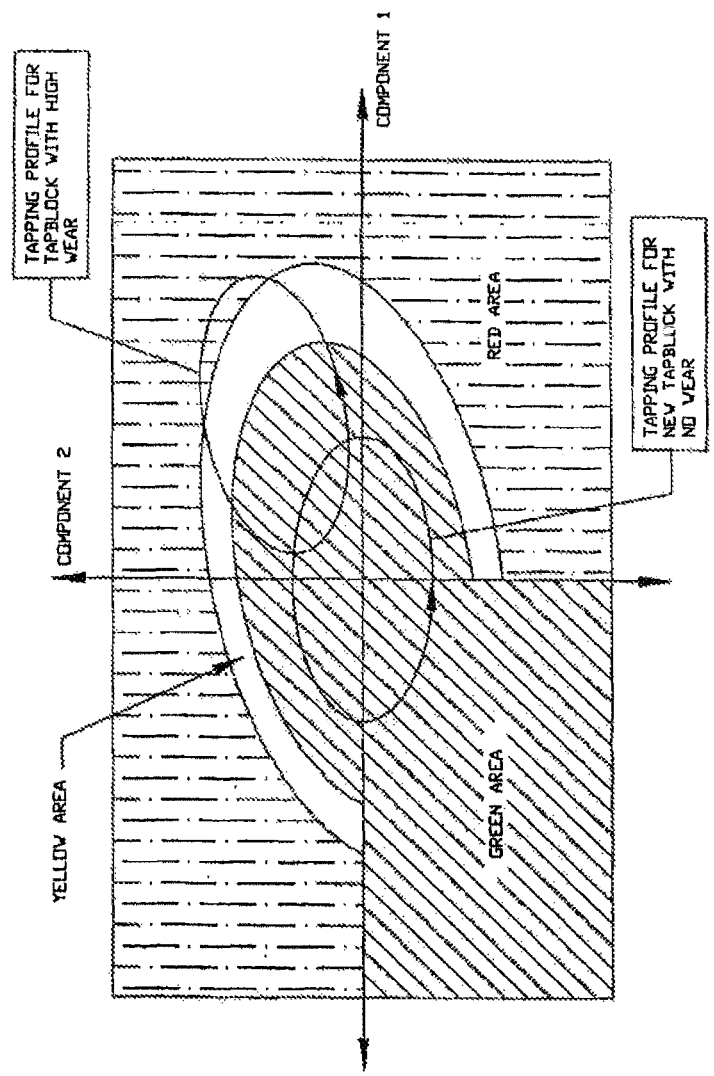
FIG. 10 is an example chart relating the Principal Component Analysis (PCA) to the operating condition of a tapblock cooling element.

FIG. 10 illustrates an example heating and cooling PCA profile for tapping with a new tapblock and an example PCA profile for a tapblock having high wear. The PCA plot is divided into regions that correspond to the green, yellow and red conditions of the tapblock. As the tap proceeds, the profile for the new tapblock is entirely within the green region and the GYR indication would remain green. The colored regions on the plot indicate that the profile for a worn block will enter the red region, indicating that tapping on that particular block should be suspended until further investigation is completed.

The second main output of the diagnostics module 270 is the tapblock health index. The health index starts at 100% for an optimally healthy tapblock and, with wear, declines to 0%. This provides an indication of the long-term accumulated loss of health or wear of the tapblock. Two methods of determining the health index are described below with reference to FIGS. 5 and 6.

Figure 5:
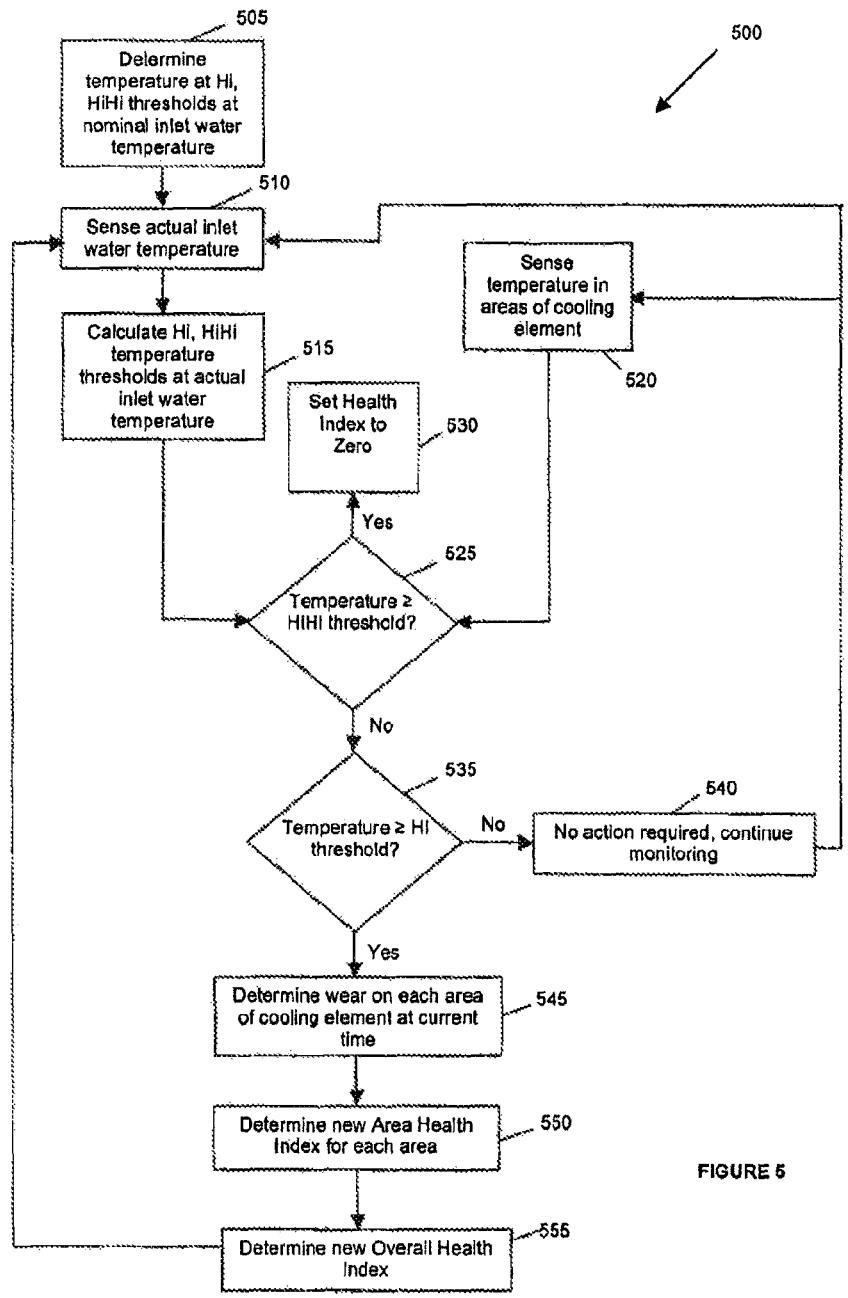
FIG. 5 is a flowchart of a method of determining a relative health indication of a cooling element.

FIG. 5 is a flow diagram of a method 500 of determining a relative condition indicator, such as the overall health index. Method 500 is event-based, in that it looks for sharp or gradual temperature changes. The method illustrated in FIG. 5 compares the temperature measurements to predefined Hi (high) and HiHi (extremely high) temperature (spike) thresholds. The spike thresholds are dynamically altered, depending on the measured reference (e.g. inlet) water temperature, to avoid registering unnecessary spikes due to high cooling-water temperatures. Should the temperature measurement exceed the Hi threshold, an event called a "temperature spike" is determined to have occurred and temperature-related wear is attributed to the tapblock based on the actual temperature level above the threshold and the time duration above the threshold.

The dynamic spike alarm level for thermocouple x may be calculated by Equation 3:

$$\text{DynamicSpikeAlarmLevel}_x = \text{Hi}_x + (\text{InletWaterTemperature} - N)$$

where N is a predetermined nominal reference water temperature. N may be about 40° C., for example, and may be set at a desired level to suit operating conditions.

The following polynomial function (Equation 4) is used to accumulate spike wear for thermocouple x when that thermocouple exceeds its dynamic spike alarm level:

$$SpikeWear_x[i] = SpikeWear_x[i-1] + K\frac{(Temperature_x - DynamicSpikeAlarmLevel_x)^{PolynomialFactor}}{(HiHi_x - DynamicSpikeAlarmLevel_x)^{PolynomialFactor}}$$

where i represents time increments and K is a weighting factor between one and zero. The time increments may be about 1 second, for example. An exemplary polynomial factor of about 5.5 is considered suitable. The polynomial factor and the weighting factor may be modified or fine-tuned based on experience.

The spike wear at each thermocouple location is accumulated to calculate an area health index for the area adjacent to each thermocouple. The overall block health index is based on a selection of one or more of the individual area health indices for the block. For example, the minimum area health index can be taken as the overall health index. Alternatively, the overall block health index may be determined as an area weighted average or based on a selection of area health indices around the minimum area health index. If the temperature exceeds the "HiHi" level in any area, the health index is set to zero.

Method 500 begins at step 505 by determining the Hi and HiHi threshold levels for a nominal inlet water temperature, such as 40° Celsius. The nominal inlet water temperature may be calculated based on normal operating conditions or may be chosen by the realtor operator. At step 510, the actual inlet water temperature of the water cooling conduits is sensed using RTDs 220. At step 515, the Hi and HiHi temperature thresholds are calculated for the actual sensed inlet water temperature, based on the thresholds determined at step 505 for a nominal inlet water temperature. This calculation is performed using Equation 3 to determine what is, in effect, a dynamic alarm level for each thermocouple.

Concurrently with steps 510 and 515, step 520 is performed, at which the temperature is sensed in areas of the cooling element using the various installed thermocouples. If, at step 525, any of the temperatures sensed at step 520 exceed the HiHi threshold dynamically determined at step 515, diagnostics module 270 sets the overall health index to zero at step 530 and a red condition will be triggered, in which operation on the specific tapblock should cease until major maintenance can occur. If none of the sensed temperatures is greater than or equal to the HiHi alarm level, it is determined at step 535 whether any of the sensed temperatures is greater than or equal to the Hi alarm threshold. If the Hi threshold is not exceeded, the diagnostic computer system 130 determines, at step 540, that no action is required, and to continue monitoring, in which case steps 510 to 525 are repeated.

If at least one of the sensed thermocouple temperatures is above the Hi threshold, then at step 545, diagnostic module 270 determines the wear to be attributed to the respective areas of the cooling element for which excessive temperatures were sensed. The determination of step 545 is made using Equation 4 for each time increment i during which the Hi threshold is equaled or exceeded by the respective sensed temperature. The accumulated wear attributable to the temperature spike for each affected area is determined at step 550. At step 555, the new overall health index is determined, based on the new area health indices determined at step 550. Steps 510 to 555 are performed repeatedly and at regular intervals to re-calculate a new overall health index as necessary. During a tapping procedure, steps 510 to 555 may be repeated more often than at other times.

Figure 6:
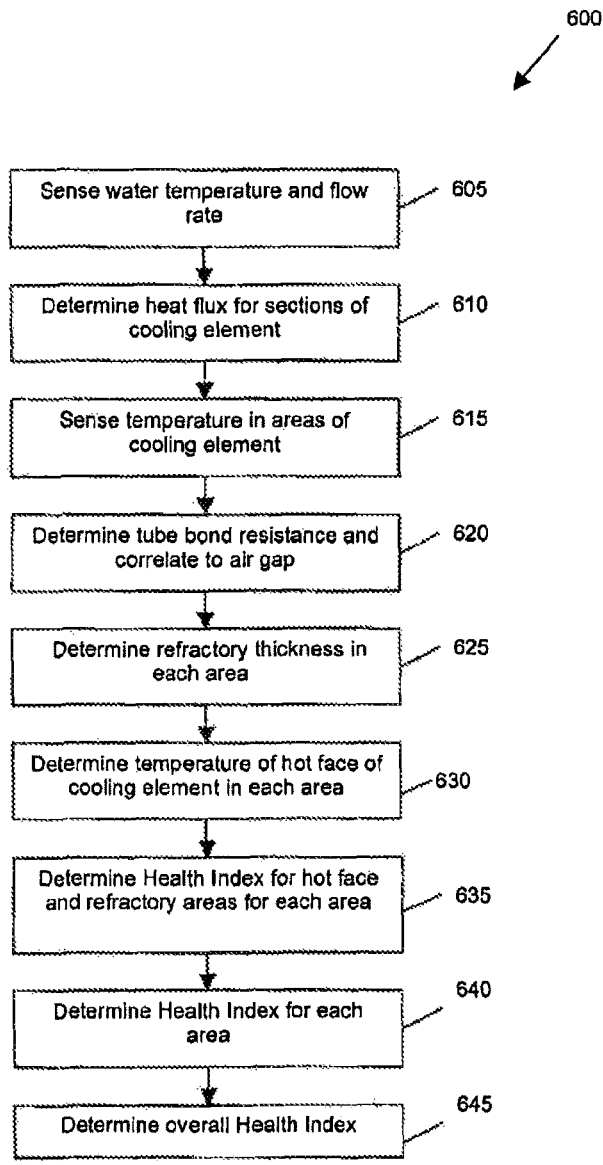
FIG. 6 is a flowchart of a second method of determining a relative health indication of a cooling element.

In addition to the temperature event-based health index determination, the diagnostic computer system 130 makes the condition-based health index determination according to a method 600 illustrated in FIG. 6, which involves estimating the physical condition of the tapblock components from the temperature and flow measurements. The physical condition may be defined, for example, by how well the cooling pipes are bound to the copper block, the physical characteristics of the copper block and the thickness of the refractory.

The method 600 begins at step 605 by sensing the inlet water temperature for the cooling circuits and the flow rate of the cooling fluid. At step 610, the heat flux for each of a number of sections or areas of the cooling element is determined according to existing heat flux calculation techniques. At step 615, the temperature in each specific area of the cooling element is sensed. Any reconstruction of faulty temperature values may be done at this point. For diagnostic purposes, the cooling element is volumetrically divided up into specific areas in order to calculate a health index specific to each area.

At step 620, the tube bond condition, expressed as thermal conduction resistance, is calculated from the temperature readings at the thermocouple locations, the inlet water temperature and the heat flux calculated using the water circuit flow and temperature rise. It may be necessary to temporarily reduce the water flowrate to get an accurate measurement of the tapblock heat flux. Using well-known equations for heat transfer, a thermal resistance is determined from the heat flux and the difference between the copper block temperature and water temperature. Using other well-known equations for heat transfer, the thermal resistance is converted into an equivalent thermal conduction resistance.

The refractory thickness adjacent to each thermocouple is calculated at step 625 using equations derived by curve fitting the graphical results from a 3-dimensional CFD model or another numerical modeling method. The equations have two inputs: 1) the thermal conduction resistance of the tube bond; and 2) the maximum thermocouple temperature measured during tapping normalized to a standard water temperature and a standard molten process material temperature.

The extrapolated copper tip temperature that would occur with high process temperatures is calculated at step 630 for each area of the tapblock from the tube bond thermal conduction resistance and refractory thickness. The copper tip temperature is the temperature of the copper block nearest the inside of the furnace or hot face. To calculate the copper tip temperature, a second set of equations is developed from the CFD (or other numerical) model that has two inputs: 1) the thermal conduction resistance of the tube bond; 2) refractory thickness. The extrapolated copper tip temperature is the temperature that would occur under high process temperature conditions; there is no need for an actual temperature spike to occur to reduce the area health index.

For each hot face and refractory area, a health index is calculated, at step 635, from the estimated refractory thickness (a linear function is used starting at 100% at new refractory thickness and going to 0% at the minimum acceptable refractory thickness) and extrapolated copper tip temperature (a linear function is used starting at 100% for the extrapolated copper tip temperature for a new tapblock with new refractory and tube bond condition and going to 0% with the extrapolated copper tip temperature at the minimum acceptable refractory thickness and poor tube bond condition).

An area health index is calculated at step 640, for example as the minimum of either the refractory thickness health index or the extrapolated copper tip temperature health index. The minimum is one example of calculating the area health index; other ways of combining the refractory thickness and copper tip temperature health indices into an area health index are also possible, such as averaging or weighted averaging.

The overall block health index is calculated at step 645 by combining the area health indices (for example, the lowest area health index can be taken as the overall health index). The "condition-based" and "spike-wear" health indices can both be displayed or combined into a single health index, for example by taking the average of the two. Following step 645, method 600 may be repeated regularly or continuously, as part of the diagnostic monitoring functions of diagnostic system 100 or 900.

Figure 7:
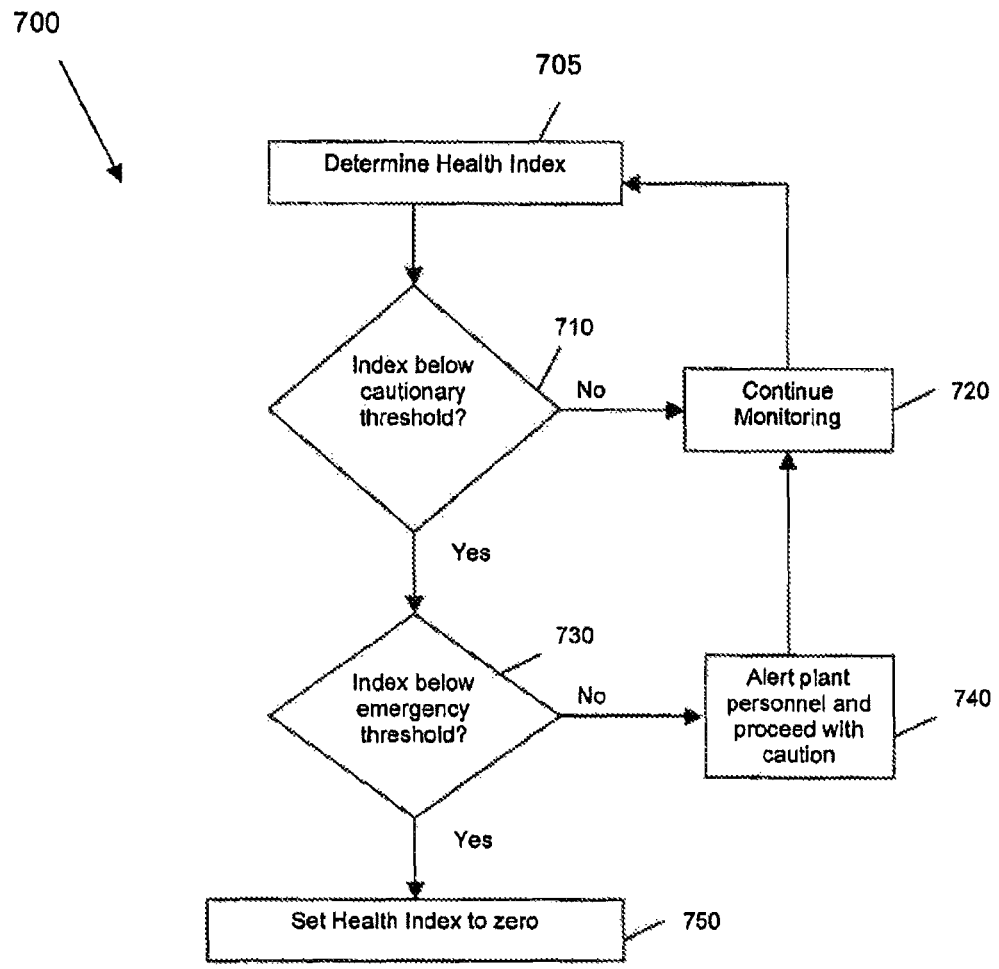
FIG. 7 is a flowchart of a method of monitoring a cooling element.

Referring now to FIG. 7, a method 700 of monitoring a cooling element is shown and described. Method 700 begins at step 705, in which an overall health index of the cooling element is determined. Step 705 may correspond to performance of method 500 or 600 or both concurrently or in sequence. Once diagnostics module 270 determines the overall health index, it compares the overall health index to the cautionary threshold at step 710. If the overall health index is above the cautionary threshold, no specific action is required and the diagnostic system 100 or 900 continues the diagnostic monitoring at step 720.

If the overall health index is below the cautionary threshold, the diagnostics module 270 determines at step 730 whether the overall health index is also below the emergency threshold. If it is not, plant personnel are alerted to the cautionary (yellow) status of the cooling element and are notified that operation of the cooling element may continue under caution, at step 740.

If the overall health index is below the emergency threshold at step 730, the health index is set to zero at step 750 and plant personnel are immediately notified of the emergency (red) status. Notification of the cautionary and emergency status is performed through reporting module 290, which provides a light (e.g. green, yellow or red) and/or graphics display on status display 140 and on displays associated with user stations 160. System 100 or 900 may automatically initiate procedures for shutting down the metallurgical reactor or ceasing the tapping operation, if appropriate, or may await an operator command to do so.

The reporting module 290 is responsible for displaying the results of the rule-based traffic light and the health index. The results are displayed to the operator using display 140 and on user stations 160. Beyond the final overall results of the traffic light and the health index, the reporting module makes supplemental diagnostic information available on additional screens to support the final results. The supplemental information allows the operators to further diagnose the condition of the equipment. In addition, when the condition of the tapblock changes, an e-mail is automatically generated by the reporting module 290 and sent to the appropriate plant personnel using a predefined mailing list.

The reporting module 290 draws information, such as temperature readings, for example, from the other modules to provide an indication to the plant personnel of the reason for the e-mail message. For example, an e-mail message may be generated whenever the status traffic light changes color from green to yellow or yellow to red. Automatic e-mail generation is a feature of existing programming languages and environments developed for the Microsoft Windows operating system. The reporting module 290 acts as a server, making diagnostic data available to the user stations 160 over the network connection 150.

Figure 9:
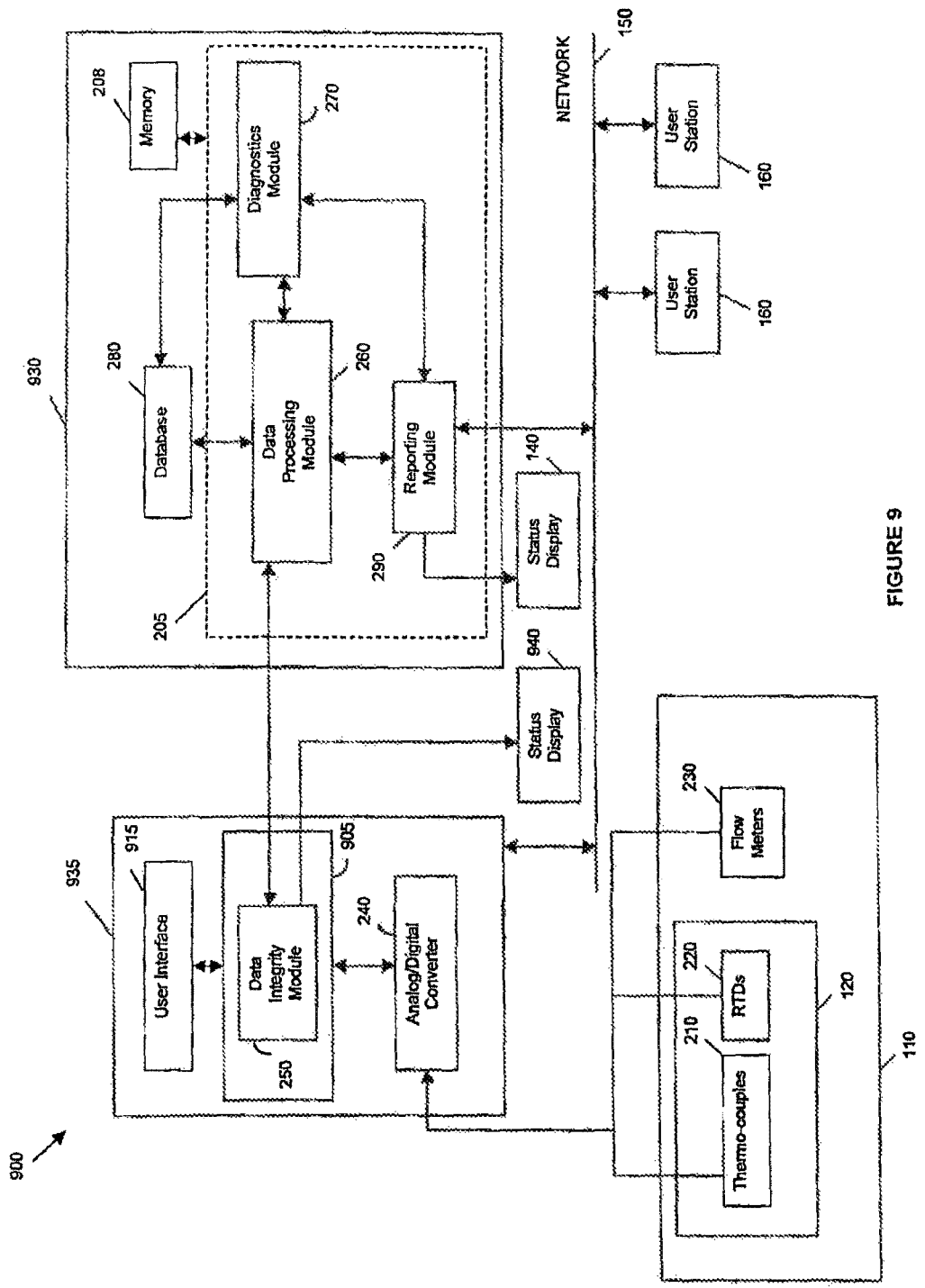
FIG. 9 is a block diagram of another embodiment of a diagnostic system for a metallurgical reactor.

FIG. 9 is a block diagram of an alternative embodiment of a diagnostic system designated by reference numeral 900. Diagnostic system 900 is similar to the diagnostic system 100 shown in FIGS. 1 and 2. The difference between the two embodiments is that in diagnostic system 900, the data processing functions (performed by modules 250, 260, 270 and 290) are divided between a programmable logic controller (PLC) 935 and a computer system 930, whereas in diagnostic system 100 the data processing functions (250, 260, 270 and 290) are all performed by the diagnostic system 130. PLC 935 is in communication with computer system 930 over a dedicated communication link or via network 150.

Dividing the processing functions between the PLC 935 and the computer system 930 creates a reliable and flexible system. PLC 935 usually has a relatively simple operating system and lacks a hard drive, which in an appropriate application make it less susceptible to errors or failures than a personal computer. Typically, once a program is started on a PLC, the program will continue to operate for an extended period, spanning months and perhaps years at a time. As a result, having the PLC monitor the field instruments 125 and provide basic feedback means that the monitoring and feedback can continue even if communication to the remainder of the diagnostic system is lost. The diagnostic computer system 930, on the other hand, can support more sophisticated programs and is able to store the complete record of the tapblock's 120 operating life.

PLC 935 is a computer that performs basic rules-based condition analysis. PLC 935 includes a processor 905, an analog to digital converter 240, a user interface 915 and may have its own connection to the network 150. Programs to be executed by the processor 905 may be written in a development environment on a personal computer and is then downloaded onto the PLC 935 directly through a cable connection. Such programs are stored in the PLC 935 in non-volatile memory (not shown).

In one embodiment, the field instruments 125, such as thermocouples 210, RTDs 220 and flow meters 230, are directly connected to the PLC 935 through special I/O connectors (not shown) on the PLC 935. Alternatively, the field instruments 125 may be connected to the PLC 935 via external I/O modules (not shown) that plug into the PLC 935.

Analog field instrument signals received by the PLC 935 are converted into digital signals by the analog to digital (A/D) converter 240. The A/D converter 240 outputs the digital signals to the processor 905 for processing. The A/D converter 240 may be an integrated part of the PLC 935 or it may be distinct therefrom but coupled thereto.

In the embodiment shown in FIG. 9, processor 905 runs data integrity module 250 to perform all of the functions of that module, as described above in relation to FIG. 2. The processor 905 also sends the processed data to the diagnostic computer system 930 for further processing. In the embodiment shown in FIG. 9, the computer system 930 performs the more computationally complex diagnostic analysis functions and provides a sophisticated display for the operators at user stations 160. The computer system 930 includes a processor 205, a database 280 and a memory unit 208, similar to diagnostic computer system 130. The diagnostic system 930 can support a more sophisticated operating system than that currently available on PLCs. The diagnostic computer system 930 may perform all or some of the functions included in the data processing module 260, the diagnostics module 270, and the reporting module 290.

In an alternative embodiment (not shown), the processor 905 may also run software to perform some of the functions of the data processing module 260 and the diagnostics module 270. Typically, the PLC 935 would not perform any of the functions of the reporting module 290, but it may provide a GYR indication independent of status display 140. For example, the processor 905 may generate a GYR status indication that is displayed on status display 940. The status display 940 may be a hard-wired pole light that displays information in a simulated traffic light display or by other visual means.

Exemplary embodiments of the invention are described herein. Certain enhancements or modifications of the described embodiments might be made without departing from the spirit and scope of the invention. Accordingly, all such enhancements or modifications, as would be apparent to those skilled in the art, are included within the spirit and scope of the invention.

The invention claimed is:

1. A diagnostic system for a cooling element of a metallurgical reactor, the system comprising:
    at least one sensor located in or proximate the cooling element, the at least one sensor configured to sense operating conditions of the cooling element at a plurality of time intervals;

at least one processor in communication with the at least one sensor, the at least one processor configured to receive data corresponding to the sensed operating conditions and process the data to determine a relative condition indicator representing accumulated wear of the cooling element, relative to an initial condition of the cooling element, at each time interval over a period of time comprising at least one metallurgical heating and cooling cycle of the cooling element; and at least one display in communication with the at least one processor, the at least one display configured to display the relative condition indicator to a user of the diagnostic system, wherein the at least one sensor comprises at least one optical fiber having temperature-dependent reflection characteristics and the at least one processor comprises a first processor in communication with the at least one sensor and a second processor in communication with the first processor.

2. The diagnostic system of claim 1, wherein the at least one display comprises a display portion configured to display a first, second or third state representative of the relative condition indicator.

3. The diagnostic system of claim 1, wherein the at least one sensor comprises a plurality of sensors and further comprises at least one flow sensor for sensing flow of cooling fluid through the cooling element.

4. The diagnostic system of claim 1, wherein the first processor is comprised in a programmable logic controller.

5. The diagnostic system of claim 1, wherein the first processor receives the data and the second processor processes the data to determine the relative condition indicator.

6. The diagnostic system of claim 1, wherein, for each of a plurality of measurement locations, two sensors are used to sense the operating conditions at the respective location.

7. The diagnostic system of claim 1, wherein the at least one sensor is positioned at least partly within the cooling element.

8. The diagnostic system of claim 1, wherein the optical fiber comprise a plurality of Bragg gratings.

9. The diagnostic system of claim 8, wherein the spacing between Bragg gratings is about 10 cm.

10. The diagnostic system of claim 1, wherein the sensed operating conditions include temperature and coolant flow conditions and wherein the relative condition indicator is determined at least in part by calculating operating parameters indicative of a physical condition of the cooling element based on the data.

11. The diagnostic system of claim 10, wherein the calculated operating parameters include one or more of a thickness of refractory material within the cooling element and a bonding quality of one or more cooling conduits in the cooling element.

12. The diagnostic system of claim 1, wherein the at least one processor is configured to process the data to determine whether a fault condition exists in at least one of the sensors.

13. The diagnostic system of claim 12, wherein the at least one sensor comprises a plurality of sensors and wherein, when the at least one processor determines that a fault condition exists, the at least one processor is configured to determine a reconstructed value for the one sensor based on values of other sensors.

14. The diagnostic system of claim 1, wherein the at least one display comprises a dedicated display coupled to the at least one processor and located proximate a metallurgical reactor having the cooling element.

15. The diagnostic system of claim 14, wherein the at least one display further comprises one or more further displays associated with respective one or more remote user stations in communication with the at least one processor over a network.

16. The diagnostic system of claim 1, wherein the cooling element comprises fluid passages for receiving cooling fluid and some of the plurality of temperature sensors are disposed for sensing temperatures of fluid in the fluid passages and wherein other temperature sensors are disposed for sensing temperatures adjacent a hot face of the cooling element.

17. The diagnostic system of claim 1, wherein the cooling element is a tapblock.

18. A diagnostic system for cooling element of a metallurgical reactor, the system comprising:

at least one sensor located in or proximate the cooling element, the at least one sensor configured to sense an operating condition of the cooling element at a plurality of time intervals;

at least one processor in communication with the at least one sensor, the at least one processor configured to receive data corresponding to the sensed operating conditions and process the data to determine a relative condition indicator representing accumulated wear of the cooling element, relative to an initial condition of the cooling element, at each time interval over a period of time comprising at least one metallurgical heating and cooling cycle of the cooling element; and at least one display in communication with the at least one processor, the at least one display configured to display the relative condition indicator to a user of the diagnostic system, wherein the at least one sensor comprises an optical fiber having temperature-dependent reflection characteristics, wherein the at least one sensor comprises a plurality of sensors and wherein the at least one processor is configured to process data corresponding to the sensed temperature to determine whether a fault condition exists in at least one of the sensors.

19. A diagnostic method for a cooling element of a metallurgical reactor, comprising:

sensing operating conditions of the cooling element relative to an initial condition of the cooling element;

receiving data corresponding to the sensed operating conditions;

processing the data to determine a relative condition indicator representing accumulated wear of the cooling element, relative to an initial condition of the cooling element, at each time interval over a period of time comprising at least one metallurgical heating and cooling cycle of the cooling element; and displaying the relative condition indicator to a user, wherein sensing is achieved by an optical fiber having temperature-dependent reflection characteristics and the relative condition indicator is determined at least in part by determining an area condition indicator for each of a plurality of areas of the cooling element.

20. The method of claim 19, wherein the step of displaying includes displaying a first, second or third state representative of the relative condition indicator.

21. The method of claim 20, wherein the first state corresponds to an operational state of the cooling element, in which the cooling element may be operated normally, the second state corresponds to a cautionary operational state of the cooling element, in which the cooling element should be operated under caution, and the third state corresponds to a non-operational state of the cooling element, in which the cooling element should cease operation or not initiate operation.

22. The method of claim 19, wherein the relative condition indicator is determined at least in part based on a level and duration of a sensed temperature when the temperature exceeds a predetermined threshold.

23. The method of claim 19, wherein the relative condition indicator is determined at least in part by the lowest or highest determined area condition indicator.

24. The method of claim 19, wherein, for each of a plurality of measurement locations, two sensors are used to sense the operating conditions at the respective location.

25. The method of claim 19, wherein the optical fiber is positioned at least partly within the cooling element.

26. The method of claim 19, wherein the optical fiber comprises a plurality of Bragg gratings.

27. The method of claim 19, wherein the relative condition indicator is determined at least in part using principal component analysis of the data.

28. The method of claim 19, wherein the sensed operating conditions include temperature and coolant flow conditions and wherein the relative condition indicator is determined at least in part by calculating operating parameters indicative of a physical condition of the cooling element based on the data.

29. The method of claim 28, wherein the calculated operating parameters include one or more of a thickness of refractory material within the cooling element and a bonding quality of one or more cooling conduits in the cooling element.

* * * * *